US012475796B2

(12) United States Patent
Smith et al.

(10) Patent No.: US 12,475,796 B2
(45) Date of Patent: Nov. 18, 2025

(54) LATCHED TURN DIRECTION FUNCTION AND INDICATION

(71) Applicant: HONEYWELL INTERNATIONAL INC., Charlotte, NC (US)

(72) Inventors: Steven Smith, Phoenix, AZ (US); Jary Engels, Phoenix, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 171 days.

(21) Appl. No.: 18/461,155

(22) Filed: Sep. 5, 2023

(65) Prior Publication Data

US 2025/0078664 A1 Mar. 6, 2025

(51) Int. Cl.

| | |
|---|---|
| ***G08G 5/21*** | (2025.01) |
| ***G08G 5/34*** | (2025.01) |
| ***G08G 5/53*** | (2025.01) |
| ***G08G 5/55*** | (2025.01) |

(52) U.S. Cl.

CPC ................. *G08G 5/21* (2025.01); *G08G 5/34* (2025.01); *G08G 5/53* (2025.01); *G08G 5/55* (2025.01)

(58) Field of Classification Search

CPC .. G08G 5/21; G08G 5/53; G08G 5/55; G08G 5/34

See application file for complete search history.

(56) References Cited

U.S. PATENT DOCUMENTS

| | | | | |
|---|---|---|---|---|
| 6,633,810 | B1 * | 10/2003 | Qureshi | G08G 5/34 340/975 |
| 8,825,366 | B2 | 9/2014 | Giovannini et al. | |
| 10,302,759 | B1 * | 5/2019 | Arteaga | G08G 5/80 |
| 10,768,661 | B2 | 9/2020 | Balasubramanian et al. | |
| 2010/0042273 | A1 | 2/2010 | Meunier et al. | |
| 2011/0082605 | A1 | 4/2011 | Coulmeau et al. | |
| 2013/0345905 | A1 * | 12/2013 | Parthasarathy | G01C 23/00 701/3 |
| 2015/0019047 | A1 | 1/2015 | Chandrashekarappa et al. | |
| 2017/0316702 | A1 * | 11/2017 | Pouillard | G08G 5/21 |
| 2022/0189323 | A1 * | 6/2022 | Chaubey | G01S 13/913 |

FOREIGN PATENT DOCUMENTS

| | | |
|---|---|---|
| CN | 110514208 A | 11/2019 |

* cited by examiner

*Primary Examiner* — Hussein Elchanti
(74) *Attorney, Agent, or Firm* — Ingrassia Fisher & Lorenz, LLP

(57) ABSTRACT

A method and system for determining and displaying a turn to a heading entry for an aircraft has been developed. First, a preliminary heading selection and a preliminary turn direction are entered into an automated flight control system (AFCS) for an aircraft. The preliminary heading selection and the preliminary turn direction are displayed to a pilot of the aircraft. A subsequent heading selection is entered into the AFCS while the aircraft is engaged in turning to the preliminary heading selection in the preliminary turn direction. A shortest turn radius to the subsequent heading selection is determined. A determination is made if the shortest turn radius to the subsequent heading selection is the same direction and the preliminary turn direction and a notice is displayed to the pilot of the aircraft is the shortest turn radius to the subsequent heading selection is not the same direction and the preliminary turn direction.

14 Claims, 4 Drawing Sheets

300

304

302

LATCHED TURN DIRECTION FUNCTION AND INDICATION

TECHNICAL FIELD

The present invention generally relates to aviation instrumentation, and more particularly relates to a system and method for displaying a latched turn direction function and indication.

BACKGROUND

Changing the heading or direction for an aircraft is an automated function in modern aircraft avionics. With the advent of direct entry based heading selection for aircraft operations, it is no longer clear which turn direction the pilot intends for the aircraft. Hence, there is a need for a system and method for displaying a latched turn direction function and indication.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for determining and displaying a turn direction for a heading entry for an aircraft, comprising: entering a preliminary heading selection and a preliminary turn direction into an automated flight control system (AFCS) for an aircraft, where the preliminary turn direction is latched by the AFCS; displaying the preliminary heading selection and the preliminary turn direction to a pilot of the aircraft; entering a subsequent heading selection into the AFCS while the aircraft is engaged in turning to the preliminary heading selection in the preliminary turn direction; determining a shortest turn radius to the subsequent heading selection; determining if the shortest turn radius to the subsequent heading selection is the same direction and the preliminary turn direction that is latched by the AFCS; and displaying a notice to the pilot of the aircraft is the shortest turn radius to the subsequent heading selection is not the same direction and the preliminary turn direction that is latched by the AFCS.

A system is provided for determining and displaying a turn direction for a heading entry for an aircraft, comprising: an automated flight control system (AFCS) onboard the aircraft, where the AFCS, receives entry of a preliminary heading selection and a preliminary turn direction for the aircraft, latches the preliminary turn direction, turns the aircraft to the preliminary heading selection in the preliminary turn direction, receives entry of a subsequent heading selection the aircraft while the aircraft is engaged in turning to the preliminary heading selection in the preliminary turn direction, determines a shortest turn radius to the subsequent heading selection, determines if the shortest turn radius to the subsequent heading selection is the same direction and the preliminary turn direction that is latched by the AFCS; and a visual display device onboard the aircraft, where the visual display device, displays a notice to the pilot of the aircraft is the shortest turn radius to the subsequent heading selection is not the same direction and the preliminary turn direction that is latched by the AFCS.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word “exemplary” means “serving as an example, instance, or illustration.” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may be separate from, or integrated within, a preexisting mobile platform management system, avionics system, or aircraft flight management system (FMS).

A method and system for determining and displaying a turn to a heading entry for an aircraft has been developed. First, a preliminary heading selection and a preliminary turn direction are entered into an automated flight control system (AFCS) for an aircraft. The preliminary heading selection and the preliminary turn direction are displayed to a pilot of the aircraft. A subsequent heading selection is entered into the AFCS while the aircraft is engaged in turning to the preliminary heading selection in the preliminary turn direction. A shortest turn radius to the subsequent heading selection is determined. A determination is made if the shortest turn radius to the subsequent heading selection is the same direction and the preliminary turn direction and a notice is displayed to the pilot of the aircraft is the shortest turn radius to the subsequent heading selection is not the same direction and the preliminary turn direction.

Figure 1:
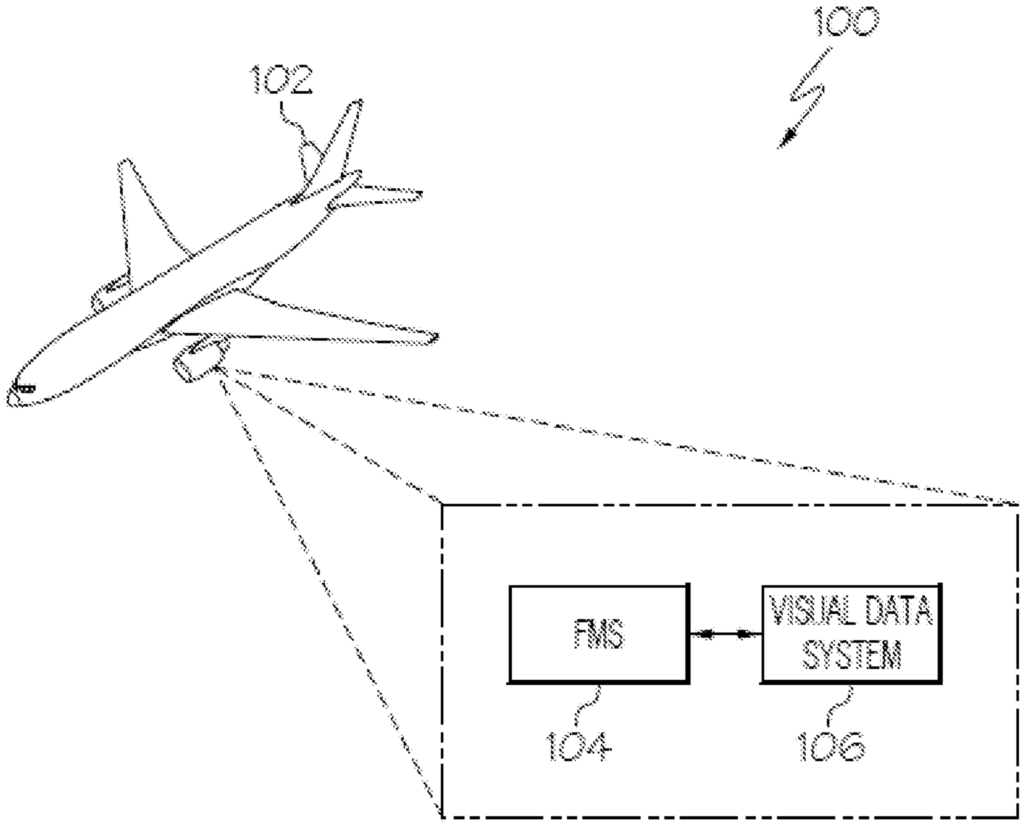
FIG. 1 shows a diagram of an in-flight aircraft that contains an onboard flight management system (FMS) along with a visual display system in accordance with one embodiment.

Turning now to FIG. 1, a diagram 100 is shown of an in-flight aircraft 102 that contains an onboard FMS 104 along with a database that is accessed by the FMS 104 in accordance with one embodiment. The FMS 104 provides data for use and display to the crew on a visual display system 106. In alternative embodiments, the database may be integrated as part of the FMS 104. In still other embodiments, the database may be located off board the aircraft on the ground and connected to the FMS 104 via a communications data link. In some embodiments, the database may include a navigation database as well as performance characteristics database of the aircraft 102 for retrieval and use by the FMS 104.

The FMS, as is generally known, is a specialized computer that automates a variety of in-flight tasks such as in-flight management of the flight plan. Using various sensors such as global positioning system (GPS), the FMS determines the aircraft's position and guides the aircraft along its flight plan using its navigation database. From the cockpit, the FMS is normally controlled through a visual display device such as a control display unit (CDU) which incorporates a small screen, a keyboard or a touchscreen. The FMS displays the flight plan and other critical flight data to the aircrew during operation.

The FMS may have a built-in electronic memory system that contains a navigation database. The navigation database contains elements used for constructing a flight plan. In some embodiments, the navigation database may be separate from the FMS and located onboard the aircraft while in other embodiments the navigation database may be located on the ground and relevant data provided to the FMS via a communications link with a ground station. The navigation database used by the FMS may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS to modify the plight flight plan before takeoff or even while in flight for variety of reasons. Such changes may be entered via the CDU. Once in flight, the principal task of the FMS is to accurately monitor the aircraft's position. This may use a GPS, a VHF omnidirectional range (VOR) system, or other similar sensor in order to determine and validate the aircraft's exact position. The FMS constantly cross checks among various sensors to determine the aircraft's position with accuracy.

Additionally, the FMS may be used to perform advanced vertical navigation (VNAV) functions. The purpose of VNAV is to predict and optimize the vertical path of the aircraft. The FMS provides guidance that includes control of the pitch axis and of the throttle of the aircraft. In order to accomplish these tasks, the FMS has detailed flight and engine model data of the aircraft. Using this information, the FMS may build a predicted vertical descent path for the aircraft. A correct and accurate implementation of VNAV has significant advantages in fuel savings and on-time efficiency.

Figure 2:
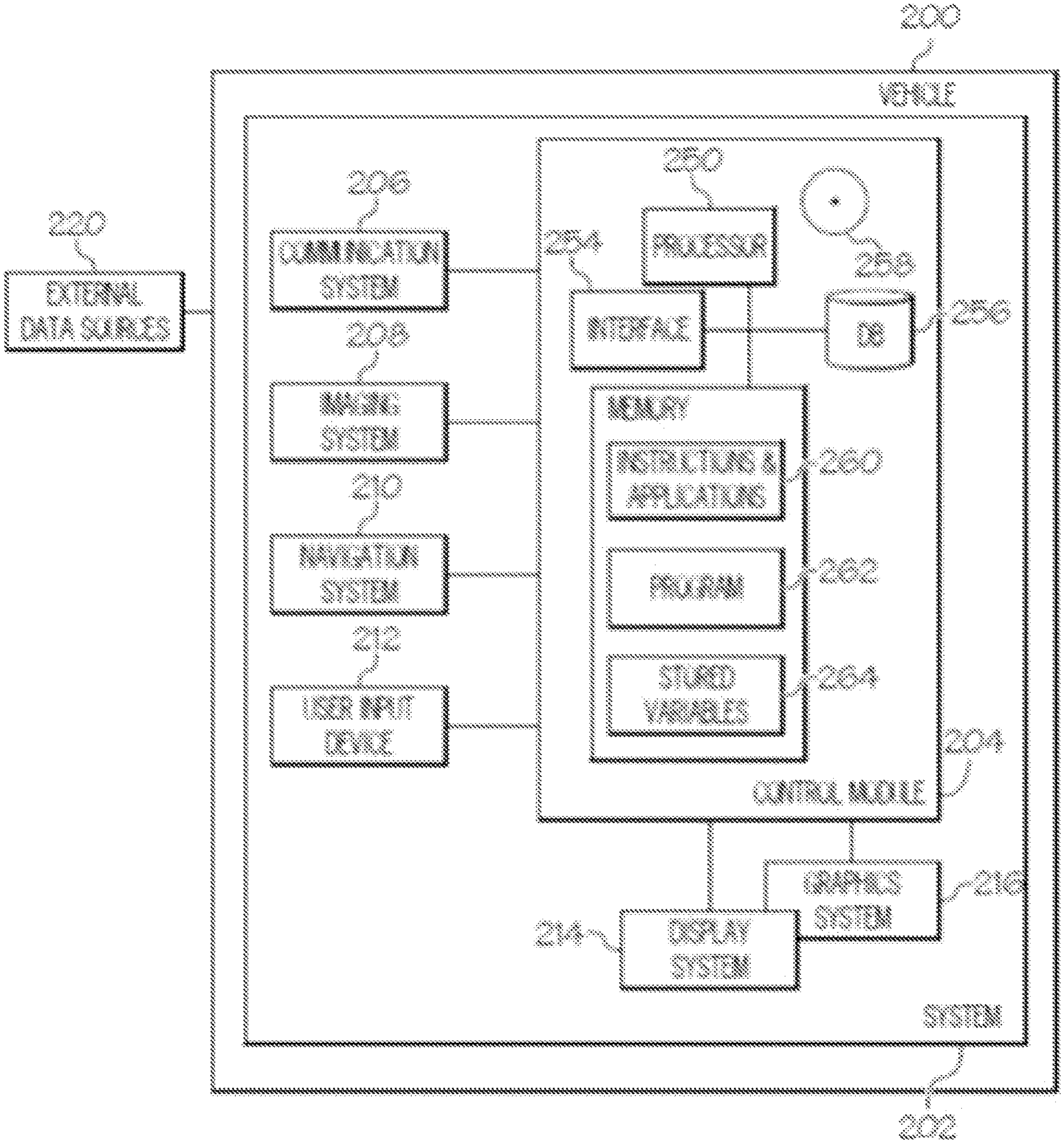
FIG. 2 shows a block diagram of a vehicle system that includes a display system in accordance with one embodiment.

Turning now to FIG. 2, in the depicted embodiment, the vehicle system 202 includes: the control module 204 that is operationally coupled to a communication system 206, an imaging system 208, a navigation system 210, a user input device 212, a display system 214, and a graphics system 216. The operation of these functional blocks is described in more detail below. In the described embodiments, the depicted vehicle system 202 is generally realized as an aircraft flight deck display system within a vehicle 200 that is an aircraft; however, the concepts presented here can be deployed in a variety of mobile platforms, such as land vehicles, spacecraft, watercraft, and the like. Accordingly, in various embodiments, the vehicle system 202 may be associated with or form part of larger aircraft management system, such as a flight management system (FMS).

In the illustrated embodiment, the control module 204 is coupled to the communications system 206, which is configured to support communications between external data source(s) 220 and the aircraft. External source(s) 220 may comprise air traffic control (ATC), or other suitable command centers and ground locations. Data received from the external source(s) 220 includes the instantaneous, or current, visibility report associated with a target landing location or identified runway. In this regard, the communications system 206 may be realized using a radio communication system or another suitable data link system.

The imaging system 208 is configured to use sensing devices to generate video or still images, and provide image data therefrom. The imaging system 208 may comprise one or more sensing devices, such as cameras, each with an associated sensing method. Accordingly, the video or still images generated by the imaging system 208 may be referred to herein as generated images, sensor images, or sensed images, and the image data may be referred to as sensed data. In an embodiment, the imaging system 208 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 208 comprises a radar based video camera system. Radar based systems emit pulses of electromagnetic radiation and listen for, or sense, associated return echoes. The radar system may generate an image or video based upon the sensed echoes. In another embodiment, the imaging system 208 may comprise a sonar system. The imaging system 208 uses methods other than visible light to generate images, and the sensing devices within the imaging system 208 are much more sensitive than a human eye. Consequently, the generated images may comprise objects, such as mountains, buildings, or ground objects, that a pilot might not otherwise see due to low visibility conditions.

In various embodiments, the imaging system 208 may be mounted in or near the nose of the aircraft (vehicle 200) and calibrated to align an imaging region with a viewing region of a primary flight display (PFD) or a Head Up display (HUD) rendered on the display system 214. For example, the imaging system 208 may be configured so that a geometric center of its field of view (FOV) is aligned with or otherwise corresponds to the geometric center of the viewing region on the display system 214. In this regard, the imaging system 208 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 214 are three dimensional, and the imaging system 208 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 210, or other aircraft and/or flight management systems.

Navigation system 210 is configured to provide real-time navigational data and/or information regarding operation of the aircraft. The navigation system 210 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 210, as will be appreciated in the art. The navigation system 210 is capable of obtaining and/or determining the current or instantaneous position and location information of the aircraft (e.g., the current latitude and longitude) and the current altitude or above ground level for the aircraft. Additionally, in an exemplary embodiment, the navigation system 210 includes inertial reference sensors capable of obtaining or otherwise determining the attitude or orientation (e.g., the pitch, roll, and yaw, heading) of the aircraft relative to earth.

The user input device 212 is coupled to the control module 204, and the user input device 212 and the control module 204 are cooperatively configured to allow a user (e.g., a pilot, co-pilot, or crew member) to interact with the display system 214 and/or other elements of the vehicle system 202 in a conventional manner. The user input device 212 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 212 may be integrated with a display device. Non-limiting examples of uses for the user input device 212 include: entering values for stored variables 264, loading or updating instructions and applications 260, and loading and updating the contents of the database 256, each described in more detail below.

The generated images from the imaging system 208 are provided to the control module 204 in the form of image data. The control module 204 is configured to receive the image data and convert and render the image data into display commands that command and control the renderings of the display system 214. This conversion and rendering may be performed, at least in part, by the graphics system 216. In some embodiments, the graphics system 216 may be integrated within the control module 204; in other embodiments, the graphics system 216 may be integrated within the display system 214. Regardless of the state of integration of these subsystems, responsive to receiving display commands from the control module 204, the display system 214 displays, renders, or otherwise conveys one or more graphical representations or displayed images based on the image data (i.e., sensor based images) and associated with operation of the vehicle 200, as described in greater detail below. In various embodiments, images displayed on the display system 214 may also be responsive to processed user input that was received via a user input device 212.

In general, the display system 214 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 214 may be part of, or include, a primary flight display (PFD) system, a panel-mounted head down display (HDD), a head up display (HUD), or a head mounted display system, such as a "near to eye display" system. The display system 214 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 204 performs the functions of the vehicle system 202. With continued reference to FIG. 2, within the control module 204, the processor 250 and the memory 252 (having therein the program 262) form a novel processing engine that performs the described processing activities in accordance with the program 262, as is described in more detail below. The control module 204 generates display signals that command and control the display system 214.

The control module 204 includes an interface 254, communicatively coupled to the processor 250 and memory 252 (via a bus), database 256, and an optional storage disk 258 or other memory storage device. In various embodiments, the control module 204 performs actions and other functions in accordance with other embodiments. The processor 250 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 252, the database 256, or a disk 258 maintain data bits and may be utilized by the processor 250 as both storage and a scratch pad. The memory locations where data bits are maintained are physical locations that have particular electrical, magnetic, optical, or organic properties corresponding to the data bits. The memory 252 can be any type of suitable computer readable storage medium. For example, the memory 252 may include various types of dynamic random access memory (DRAM) such as SDRAM, the various types of static RAM (SRAM), and the various types of non-volatile memory (PROM, EPROM, and flash). In certain examples, the memory 252 is located on and/or co-located on the same computer chip as the processor 250. In the depicted embodiment, the memory 252 stores the above-referenced instructions and applications 260 along with one or more configurable variables in stored variables 264. The database 256 and the disk 258 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 256 may be organized and/or imported from an external source 220 during an initialization step of a process.

The bus serves to transmit programs, data, status and other information or signals between the various components of the control module 204. The bus can be any suitable physical or logical means of connecting computer systems and components. This includes, but is not limited to, direct hard-wired connections, fiber optics, infrared and wireless bus technologies.

The interface 254 enables communications within the control module 204, can include one or more network interfaces to communicate with other systems or components, and can be implemented using any suitable method and apparatus. For example, the interface 254 enables communication from a system driver and/or another computer system. In one embodiment, the interface 254 obtains data from external data source(s) 220 directly. The interface 254 may also include one or more network interfaces to communicate with technicians, and/or one or more storage interfaces to connect to storage apparatuses, such as the database 256.

It will be appreciated that the vehicle system 202 may differ from the embodiment depicted in FIG. 2. As mentioned, the vehicle system 202 can be integrated with an existing flight management system (FMS) or aircraft flight deck display. During operation, the processor 250 loads and executes one or more programs, algorithms and rules embodied as instructions and applications 260 contained within the memory 252 and, as such, controls the general operation of the control module 204 as well as the vehicle system 202. In executing the process described herein, the processor 250 specifically loads and executes the novel program 262. Additionally, the processor 250 is configured to process received inputs (any combination of input from the communication system 206, the imaging system 208, the navigation system 210, and user input provided via user input device 212), reference the database 256 in accordance with the program 262, and generate display commands that command and control the display system 214 based thereon.

Figure 3:
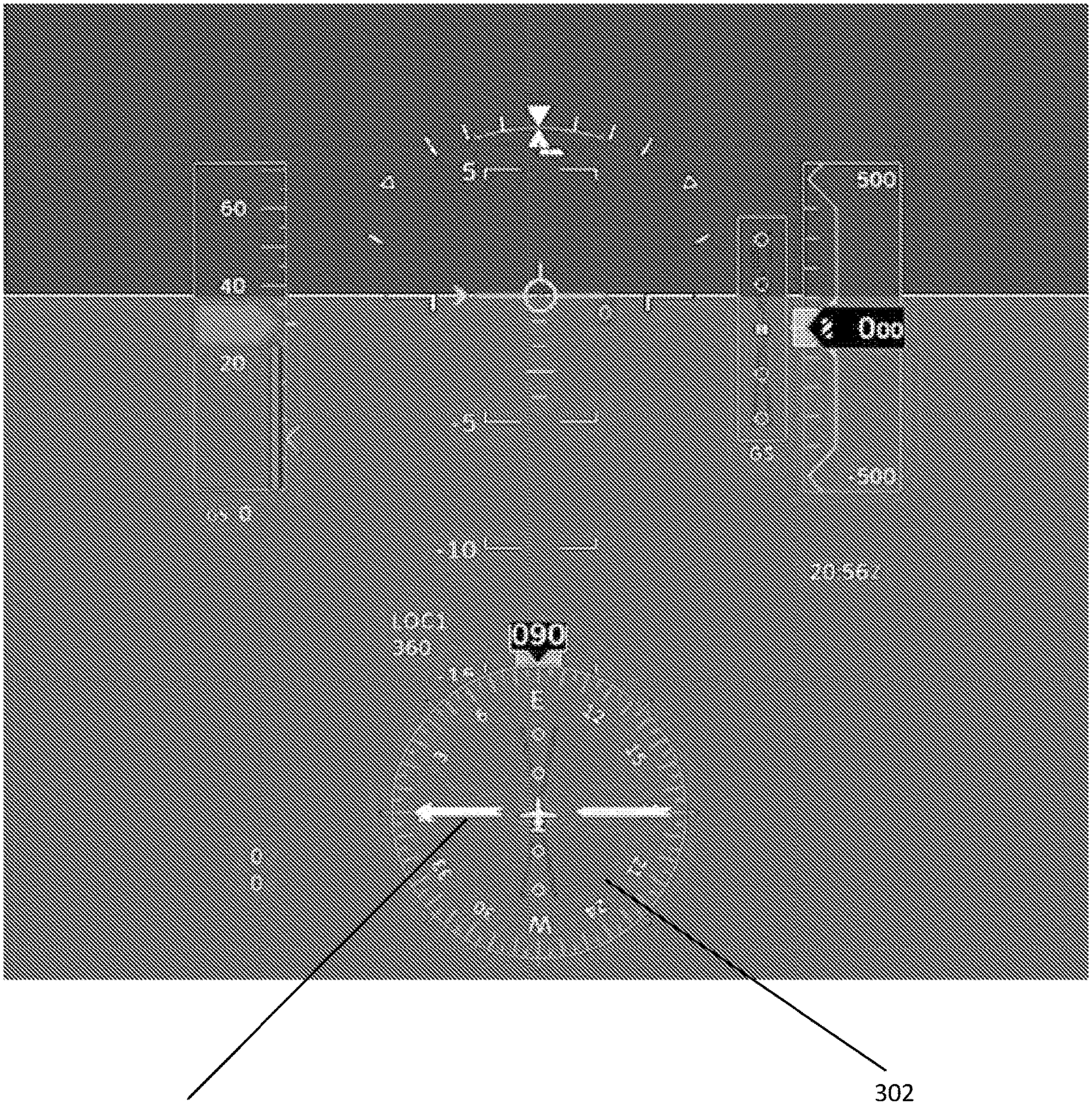
FIG. 3 shows a diagram of a typical lateral navigational flight display with a direction and deviation indicator in accordance with one embodiment.

Turning now to FIG. 3, a diagram is shown of a diagram of a typical lateral navigational flight display 300 with a direction 302 and deviation 304 indicator in accordance with one embodiment. In some embodiments, the heading direction and the turn direction may be entered manually by the pilot. In other embodiments, once the heading direction is entered, the automated flight control system will automatically select a turn direction (e.g., usually the turn direction with the smallest radius from the current heading).

When using a direct entry based heading selection, it is often not clear which turn direction is intended by the pilot. In operations of an automated flight control system for an aircraft, once the heading direction is entered, the heading turn direction may be "latched". Latched is defined as having the turn direction locked into place within the system so that any subsequent heading changes will follow the latched turn direction. For example, if the current heading is 360° and ATC commands a left turn to 090°, a specific command is entered in to the system by an aircrew member to make a left turn. This will result in a left 270° turn (i.e., non-standard) to heading 090° even though it may have been "natural" for the system to command a turn in a shorter direction (i.e., 90° right turn). The left turn direction is considered latched by the automated flight control system.

In this example, the turn direction is initiated by instruction to the system and the turn direction is latched for a turn of greater than 180°. A depiction of the latched turn direction is displayed (e.g., a left arrow/chevron/etc.) on the horizontal situation indicator (HIS) on the flight display. While in the turn, ATC gives a modification to the final heading (i.e., continue left turn to heading of) 100°. In some situations, it is possible that the aircraft would improperly turn right to intercept the new heading. However, the entry should command the aircraft to continue the left turn to the subsequently assigned heading. Present embodiments would make the determination to utilize the latched turn direction and would then take the shortest route/roll to the new heading. (e.g., if the final entered heading would be within 10 degrees of the current heading). This information would then be displayed to the pilot.

Figure 4:
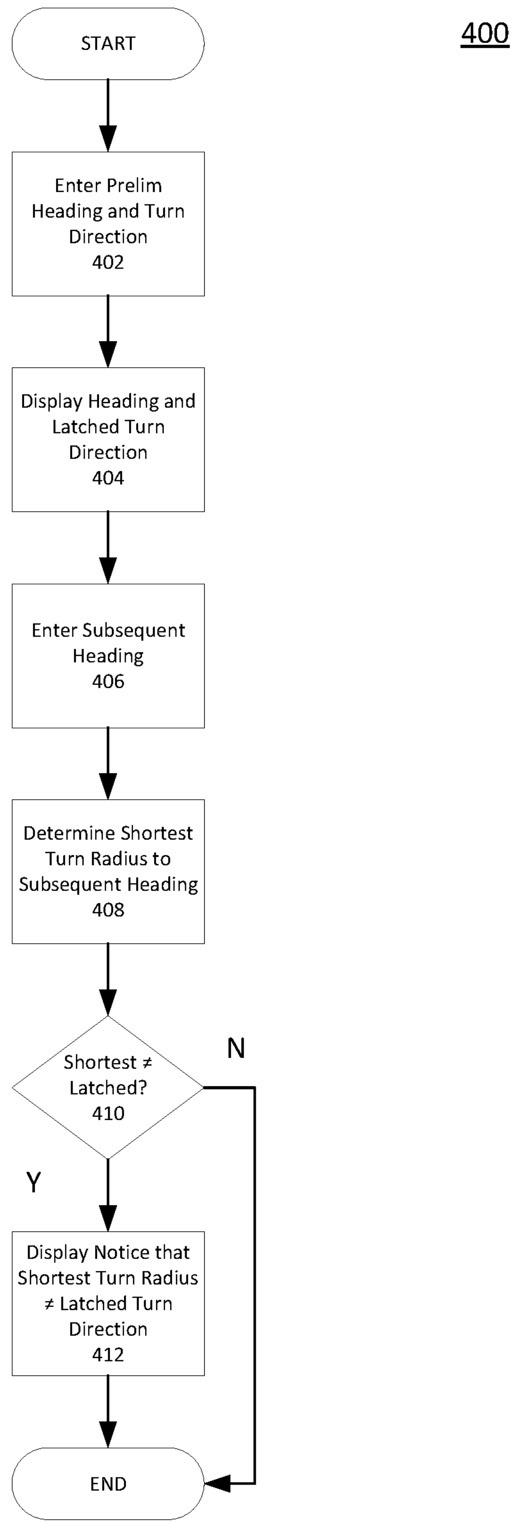
FIG. 4 shows a flowchart of a method for displaying a latched turn direction function and indication in accordance with one embodiment.

Turning now to FIG. 4, a flowchart 400 is shown of a method for displaying a latched turn direction function and indication in accordance with one embodiment. First, a preliminary heading selection and a preliminary turn direction (which now becomes latched) are entered into an automated flight control system for an aircraft 402. The term "preliminary heading selection" and "preliminary turn direction" may also include an existing heading selection and existing turn direction which are currently active for the aircraft. In some embodiments, the turn direction may default to a turn direction that may become a latched direction. Also, the preliminary turn direction may or may not be the shortest turn radius for the aircraft to reach the preliminary heading selection. The preliminary heading selection and the preliminary latched turn direction are displayed to a pilot of the aircraft 404. A subsequent heading selection is entered into the automated flight control system while the aircraft is engaged in turning to the preliminary heading selection in the preliminary turn direction 406. A shortest turn radius to the subsequent heading selection is determined 408 and a determination is made if the shortest turn radius differs from the latched turn direction 410. If the latched turn direction is different from the shortest turn radius to subsequent heading selection (i.e., the aircraft will take the longer turn direction to reach the subsequent heading selection), a notification is displayed to the pilot of the aircraft 412.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining and displaying a turn direction for a heading entry for an aircraft, comprising:
- entering a preliminary heading selection and a preliminary turn direction into an automated flight control system (AFCS) for an aircraft, where the preliminary turn direction is latched by the AFCS;
- displaying the preliminary heading selection and the preliminary turn direction to a pilot of the aircraft;
- entering a subsequent heading selection into the AFCS while the aircraft is engaged in turning to the preliminary heading selection in the preliminary turn direction, where the AFCS generates a subsequent turn direction to reach the subsequent heading selection;
- determining a shortest turn radius to the subsequent heading selection by comparing a turn radius in the preliminary turn direction to reach the preliminary heading with a turn radius in the subsequent turn direction to reach the subsequent heading;
- determining if the shortest turn radius to the subsequent heading selection is the same direction and the preliminary turn direction that is latched by the AFCS; and
- displaying a notice to the pilot of the aircraft that the shortest turn radius to the subsequent heading selection is not the same direction and the preliminary turn direction that is latched by the AFCS; and
- prompting the pilot of the aircraft to switch aircraft turn direction to the turn direction with the shortest turn radius.

2. The method of claim 1, where the preliminary heading selection is determined by air traffic control (ATC).

3. The method of claim 1, where the preliminary turn direction is determined by air traffic control (ATC).

4. The method of claim 1, where the subsequent heading selection is determined by air traffic control (ATC).

5. The method of claim 1, where the subsequent turn direction is determined by air traffic control (ATC).

6. The method of claim 1, where the preliminary turn direction is entered manually by the pilot.

7. The method of claim 6, where the preliminary turn direction is latched by the AFCS after the preliminary turn direction is manually entered by the pilot.

8. A system for determining and displaying a turn direction for a heading entry for an aircraft, comprising:
- an automated flight control system (AFCS) onboard the aircraft, where the AFCS,
  - receives entry of a preliminary heading selection and a preliminary turn direction for the aircraft,
  - latches the preliminary turn direction,
  - turns the aircraft to the preliminary heading selection in the preliminary turn direction,
  - receives entry of a subsequent heading selection the aircraft while the aircraft is engaged in turning to the preliminary heading selection in the preliminary turn direction,
  - generates a subsequent turn direction to reach the subsequent heading selection,
  - determines a shortest turn radius to the subsequent heading selection by comparing a turn radius in the preliminary turn direction to reach the preliminary heading with a turn radius in the subsequent turn direction to reach the subsequent heading,
  - determines if the shortest turn radius to the subsequent heading selection is the same direction and the preliminary turn direction that is latched by the AFCS;
- a visual display device onboard the aircraft, where the visual display device,
  - displays a notice to the pilot of the aircraft that the shortest turn radius to the subsequent heading selection is not the same direction and the preliminary turn direction that is latched by the AFCS, and
  - prompts the pilot of the aircraft to switch aircraft turn direction to the turn direction with the shortest turn radius.

9. The system of claim 8, where the preliminary heading selection is determined by air traffic control (ATC).

10. The system of claim 8, where the preliminary turn direction is determined by air traffic control (ATC).

11. The system of claim 8, where the subsequent heading selection is determined by air traffic control (ATC).

12. The system of claim 8, where the subsequent turn direction is determined by air traffic control (ATC).

13. The system of claim 8, where the preliminary turn direction is entered manually by the pilot.

14. The system of claim 13, where the preliminary turn direction is latched by the automated flight control system after the preliminary turn direction is manually entered by the pilot.

* * * * *